Patented Feb. 22, 1944

2,342,136

UNITED STATES PATENT OFFICE 2,342,136

ANTIOXIDANT

Carlin F. Gibbs, Cuyahoga Falls, Ohio, assignor to The B. F. Goodrich Company, New York, N. Y., a corporation of New York No Drawing. Application December 10, 1942, Serial No. 468,549

8 Claims. (Cl. 260—808)

This invention relates to the preservation of organic materials which tend to deteriorate by absorption of oxygen from the atmosphere, and the means for preventing such deterioration. This application is a continuation-in-part of my application Serial No. 405,791, filed August 7, 1941.

The method of my invention comprises incorporating in the material to be preserved, as an antioxidant, a certain kind of alkenyloxy diarylamines. Among the materials which may be thus preserved are unsaturated fatty oils such as linseed oil or tung oil, petroleum oils such as gasolines, soaps, aldehydes, synthetic resins, turpentine, fish oils, rubber, and the like.

Any of the natural rubbers such as caoutchouc, balata, gutta percha, latex, as well as artificial rubber isomers, and such synthetic rubbers as the copolymers of butadiene with acrylonitrile, styrene, isobutylene, methyl acrylate, methyl methacrylate, and the like, whether vulcanized or unvulcanized, may have their resistance to light, heat, and air greatly increased by the incorporation of a small amount, from 0.1 to 5.0% or more, of my new compounds in the rubber composition. The resistance of vulcanized rubber compositions to flex cracking is particularly improved by the use of these materials.

Specific examples of the materials which may be used as antioxidants include, among others, 3-beta-methallyl-4-methallyloxy-diphenylamine
2-methallyloxy-3-beta-methallyl-diphenylamine
2-methallyloxy-diphenylamine
3-methallyloxy-diphenylamine
4-methallyloxy-diphenylamine
4,4'-dimethallyloxy-diphenylamine
4-methallyloxy-phenyl-alpha-naphthylamine
4-methyl-4'-methallyloxy-diphenylamine
4-methyl-phenylamino-4'-methallyloxy-diphenylamine
4-anilino-4'-methallyloxy-diphenylamine The antioxidants of my invention have the following general formula

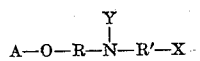

where R and R' are each an aryl radical singly bonded to O and N, and to N and X respectively. They are preferably further unsubstituted, but may contain as further substituents in the aryl nucleus such groups as the following: amino, halogen, secondary or tertiary alkylamino, secondary or tertiary arylamino, mercapto, alkyl mercapto, etc. Y is hydrogen, nitroso, or amino; O is oxygen; N is nitrogen; A is an alkenyl group; X is hydrogen or an alkenyloxy group. In either or both A and X the alkenyl group may be further substituted with maintenance of the unsaturated bond as by any of the following groups: halogen, amino, hydroxyl, secondary or tertiary alkyl amino, secondary or tertiary aryl amino, mercapto, alkyl mercapto, alkoxy, aryloxy.

The preferred class of substituted diarylamines have the structure

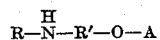

where R is an aryl radical of the benzene, naphthalene, or diphenyl series singly bonded to N and O respectively; and A is an alkenyl radical singly bonded to the oxygen, having the general formula

or in the case of an alkenyl group bearing a substituent, having the general formula:

where X is halogen, hydroxy, alkoxy, anilino, amino, aryl, tertiary amino, etc. The radicals R and R' may also contain substituents such as halogen, hydroxy, aryloxy, alkyl, amino, aryl, secondary alkylamino, tertiary alkylamino, alkenyloxy, anilino, mercapto, alkyl mercapto, alkenyl, etc.

As a specific example of my invention I describe the preparation and use of 4-methallyloxy-diphenylamine and 3-beta-methallyl-4-methallyloxy-diphenylamine. One molecular proportion of p-hydroxydiphenylamine is heated with one molecular proportion of beta-methallyl chloride in the presence of about 1.5 molecular proportions of 10% alcoholic potash. The reaction is complete after the mixture has been refluxed for about two hours, and the product is separated by cooling the mixture, neutralizing it with acid, and filtering. The product may be recrystallized from alcohol.

Rearrangement of the methallyloxy diphenylamine to 3-beta-methallyl-4-hydroxy-diphenylamine is readily accomplished by heating the ether with about one-half its weight of diethylaniline as solvent for about thirty to fifty minutes at 200° C. Other solvents such as dimethylaniline or various hydrocarbons may also be used. The product may be separated from the reaction mixture by distillation at reduced pressure. The material boils at 165° to 175° C. at 3 mm. Similar compounds may be obtained by treating other beta-alkyl allyl ethers under similar conditions.

The compound 3-beta-methallyl-4-methallyloxy-diphenylamine is obtained by heating the foregoing hydroxy compound with one molecular equivalent of beta-methallyl chloride in the presence of about 1.5 molecular equivalents of 10% alcoholic potash. The reaction is complete after refluxing for about two hours, and the product is separated by cooling the mixture, neutralizing it, and filtering.

When about one part by weight of either 4-methallyloxy diphenylamine or 3-beta-methallyl-4-methallyloxy diphenylamine is added to a composition containing 100 parts of rubber, 50 parts of carbon black, 5 parts of zinc oxide, 3 parts of sulfur, 3 parts of pine tar, 3.5 parts of stearic acid, and 1.0 part of mercaptobenzothiazole, and the composition is vulcanized, the resultant rubber stock retains its tensile strength and elongation at break to a much greater extent under severe aging conditions than does a similar vulcanized rubber composition containing no antioxidant. Whereas the tensile strength of the rubber composition containing no antioxidant dropped from about 3800 to 4000 lb. per sq. in. to 1000 lb. per sq. in. or lower after a few days aging in oxygen at 300 lb. per sq. in. and at 70° C., the tensile strength of similar rubber compositions containing these new antioxidants was considerably over 2000 lb. per sq. in. after the same period of aging. The resistance of the rubber composition to flex cracking was also greatly increased by my antioxidants.

Any of the usual pigments, fillers, dyes, reinforcing agents, softeners, accelerators, vulcanizing agents, other antioxidants, or the like may also be present. Rubber compositions containing these new antioxidants may be used for a variety of purposes, such as tires and tubes, hose, belting, molded goods, and the like. Such compositions may be vulcanized by any of the usual methods, such as is steam, hot air, or in a mold.

Although I have herein disclosed specific embodiments of my invention, I do not intend to limit myself solely thereto, but to embrace all the obvious modifications included within the scope of the appended claims.

I claim:

1. Method of preserving organic substances which tend to deteriorate by absorption of oxygen from the air which comprises incorporating therein a methallyloxy diarylamine.

2. Method of preserving organic substances which tend to deteriorate by absorption of oxygen from the air which comprises incorporating therein methallyloxy diphenylamine.

3. A method of preserving rubber which comprises incorporating therein a methallyloxy diarylamine.

4. A method of preserving rubber which comprises incorporating therein a 4-methallyloxy diphenylamine.

5. A method of preserving organic substances which tend to deteriorate by absorption of oxygen from the air which comprises incorporating therein a compound having this formula

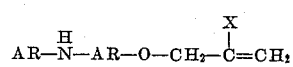

where AR represents an aromatic nucleus attached to the nitrogen directly through a nuclear carbon atom and X is an alkyl radical.

6. A rubber product containing a 4-methallyloxy diphenylamine.

7. The vulcanization product of a vulcanizable rubber composition containing a methallyloxy diarylamine.

8. The vulcanization product of a vulcanizable rubber composition containing methallyloxy diarylamine.

CARLIN F. GIBBS.